(12) United States Patent
Arnold

(10) Patent No.: US 7,131,511 B2
(45) Date of Patent: Nov. 7, 2006

(54) MOTORCYCLE WITH A REAR SUSPENSION HAVING A PULL SHOCK TRACK SYSTEM

(75) Inventor: David W. Arnold, Glendale, CA (US)

(73) Assignee: Honda Motor Co., Ltd., Tokyo (JP)

(*) Notice: Subject to any disclaimer, the term of this patent is extended or adjusted under 35 U.S.C. 154(b) by 209 days.

(21) Appl. No.: 10/875,430

(22) Filed: Jun. 24, 2004

(65) Prior Publication Data

US 2005/0284680 A1    Dec. 29, 2005

(51) Int. Cl.
B62M 7/00    (2006.01)

(52) U.S. Cl. ............................ 180/227; 280/284

(58) Field of Classification Search ......... 280/284, 280/285, 288, 275, 283; 180/227, 219
See application file for complete search history.

(56) References Cited

U.S. PATENT DOCUMENTS

| | | | |
|---|---|---|---|
| 463,710 A | 11/1891 | Mathews | |
| 3,948,543 A | 4/1976 | Macdonald et al. | |
| 4,556,119 A | 12/1985 | Shiratsuchi | |
| 4,596,302 A * | 6/1986 | Suzuki et al. | 180/227 |
| 4,653,604 A | 3/1987 | de Cortanze | |
| 4,724,920 A | 2/1988 | Tsuchida et al. | |
| 5,495,913 A * | 3/1996 | Salisbury | 180/227 |
| 5,816,357 A | 10/1998 | Camlin | |
| 6,527,289 B1 | 3/2003 | Parigian | |
| 6,581,711 B1 * | 6/2003 | Tuluie | 180/227 |

* cited by examiner

*Primary Examiner*—Tony Winner
(74) *Attorney, Agent, or Firm*—Rankin, Hill, Porter & Clark LLP; Christen Millard

(57) ABSTRACT

A motorcycle including a main frame, a rear swing frame, and a pull shock assembly operatively disposed between the main frame and the rear swing frame. The swing frame is pivotally mounted to the main frame. The main frame includes a pair of slide tracks that receive a slide member of the pull shock assembly. A link arm extends between a forward portion of the swing frame and the slide member, and translates pivotal movement of the swing frame into sliding longitudinal movement of the slide member. A damper associated with the slide member restricts sliding movement of the slide member and, thus, pivotal movement of the swing frame. The link has a forward end secured to the swing frame and a rearward end secured to the slide member.

20 Claims, 5 Drawing Sheets

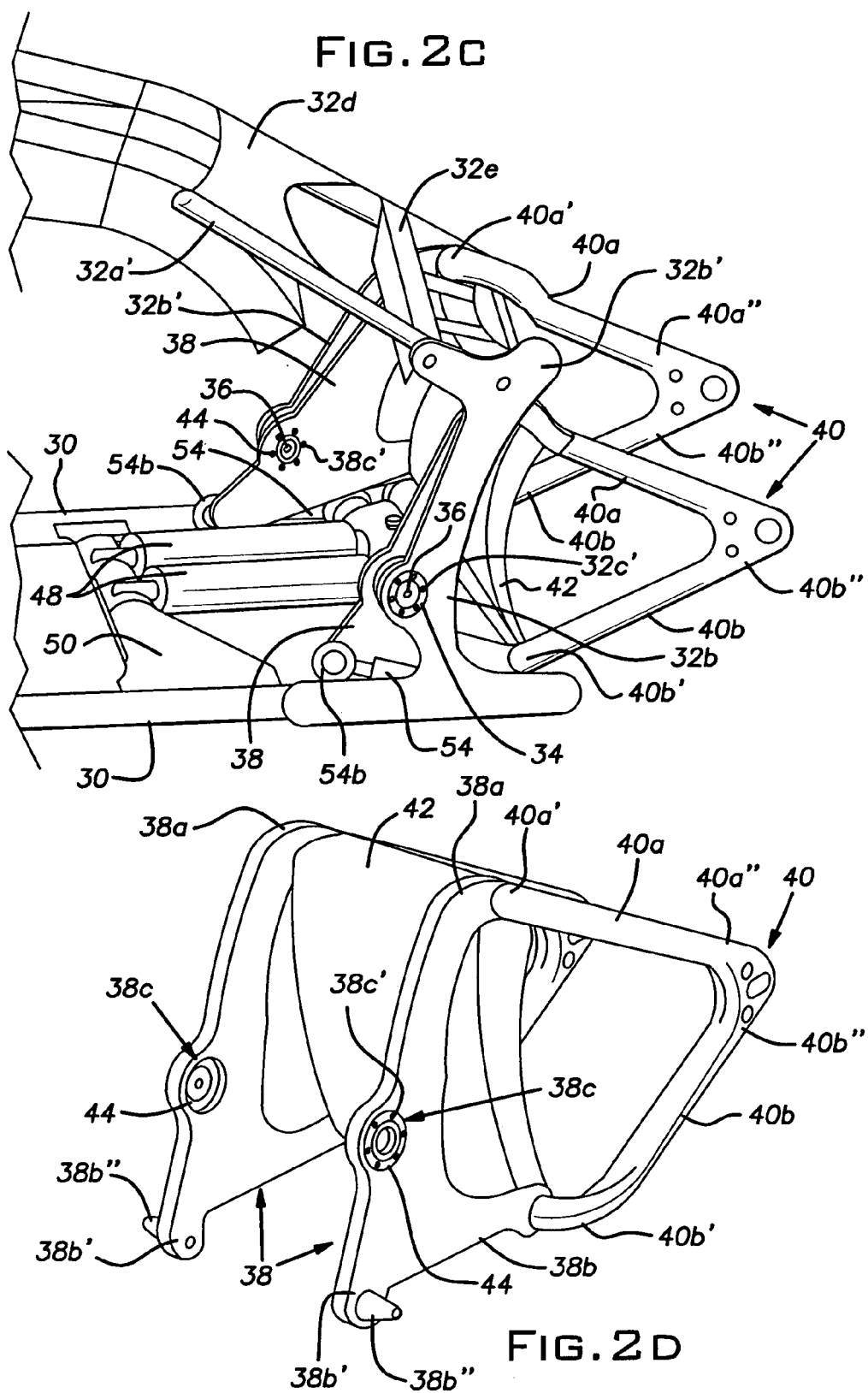

MOTORCYCLE WITH A REAR SUSPENSION HAVING A PULL SHOCK TRACK SYSTEM

BACKGROUND OF THE INVENTION

1. Field of the Invention

The present invention is generally directed toward motorcycle suspension systems and, more particularly, toward rear suspensions for motorcycles having a rear swing frame.

2. Description of Related Art

Motorcycles having a rear swing frame are known in the art. Moreover, suspension systems for motorcycles having rear swing frames are also known in the art. Such suspension systems typically include one or more shock absorbers that extend from a forward portion of the rear swing frame upwardly to a rear portion of the front or main frame. In these known systems, the shock absorber is typically aligned with the pivotal direction of the rear swing frame so as to dampen the pivotal movement of the rear swing frame.

Unfortunately, the conventional rear swing frame designs and, more particularly, rear swing frame suspensions, require a significant amount of open space. In some motorcycles, such space is simply not available. Further, the conventional swing frame suspensions present an appearance that may be undesirable. Therefore, there exists a need in the art for an improved rear suspension for a motorcycle having a rear swing frame that provides a low profile and is generally hidden in use.

SUMMARY OF THE INVENTION

The present invention is directed toward an improved rear suspension for a motorcycle having a rear swing frame wherein the suspension is generally hidden in use, has a low profile, and permits use in motorcycles wherein limited space is available.

In accordance with the present invention, a motorcycle includes a main frame, and a rear suspension assembly. The main frame has a forward end and a rearward end. A front wheel is secured to the main frame and defines a first rotational axis. The rear suspension assembly includes a rear swing frame and a shock assembly. The rear swing frame is pivotally secured to the main frame. The shock assembly is operable to dampen pivotal movement of the rear swing frame relative to the main frame.

In further accordance with the present invention, a rear wheel is secured to the rear swing frame and is vertically movable therewith. The rear wheel defines a second rotational axis. The rear swing frame is pivotally secured to the main frame at a location that is vertically above a line extending between the first and second rotational axes when the rear suspension assembly is at rest.

In further accordance with the present invention, the rear suspension assembly further includes a slide member and a damper. The slide member is slidably secured to the main frame while the damper is affixed to the slide member and to the main frame. The slide member is operatively associated with the rear swing frame so as to translate pivotal movement of the rear swing frame into: longitudinal movement of the slide member.

BRIEF DESCRIPTION OF THE DRAWINGS

These and further features of the invention will be apparent with reference to the following description and drawings, wherein:

FIG. 2C is a partial perspective view illustrating a rear portion of a main frame secured to the rear swing frame and illustrating the rear suspension assembly;

FIG. 2D is a perspective view of the rear swing frame;

DETAILED DESCRIPTION OF THE PREFERRED EMBODIMENTS

Initially it is noted that the present invention is not directed toward the specific arrangement and relative position of various motorcycle components, but rather is directed toward an improved motorcycle frame and an improved rear suspension for a motorcycle having a rear swing frame. Accordingly, many conventional features of the present invention will only be illustrated herein schematically and will only be discussed hereinafter in a cursory fashion and only as necessary to explain the frame and suspension of the present invention.

If further information regarding other aspects of the motorcycle is desired that are not discussed at length herein, reference should be made to the commonly assigned copending U.S. patent applications Ser. No. 10/780,336, filed Feb. 17, 2004; Ser. No. 10/780,201 filed Feb. 17, 2004; and Ser. No. 10/877,536, filed Jun. 24, 2004, entitled MOTORCYCLE WITH IMPROVED THERMOSTAT MOUNTING, the disclosures of which are expressly incorporated herein in their entireties.

Figure 1:
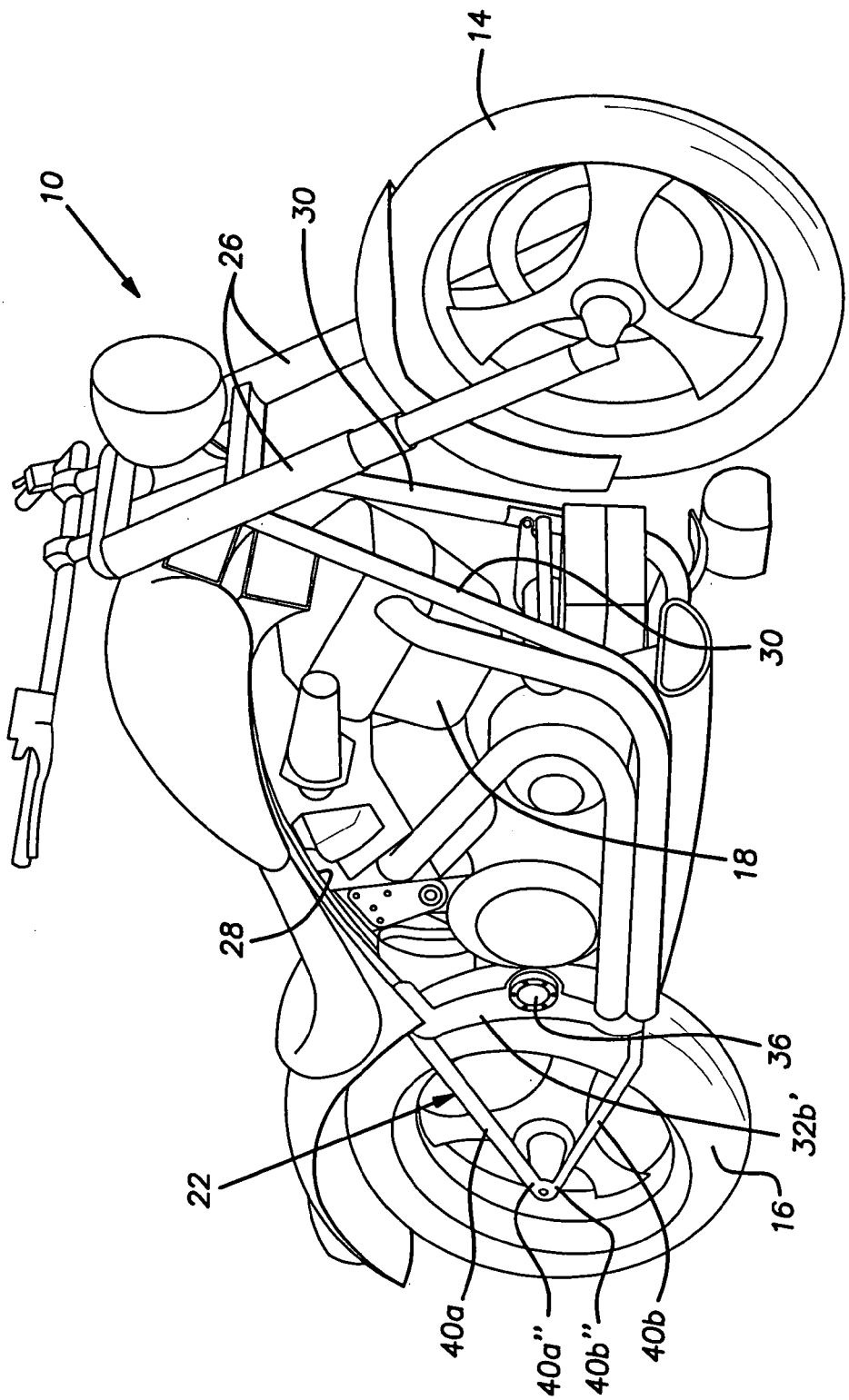
FIG. 1 is a schematic perspective view of a motorcycle incorporating the rear suspension of the present invention.
Figure 5:
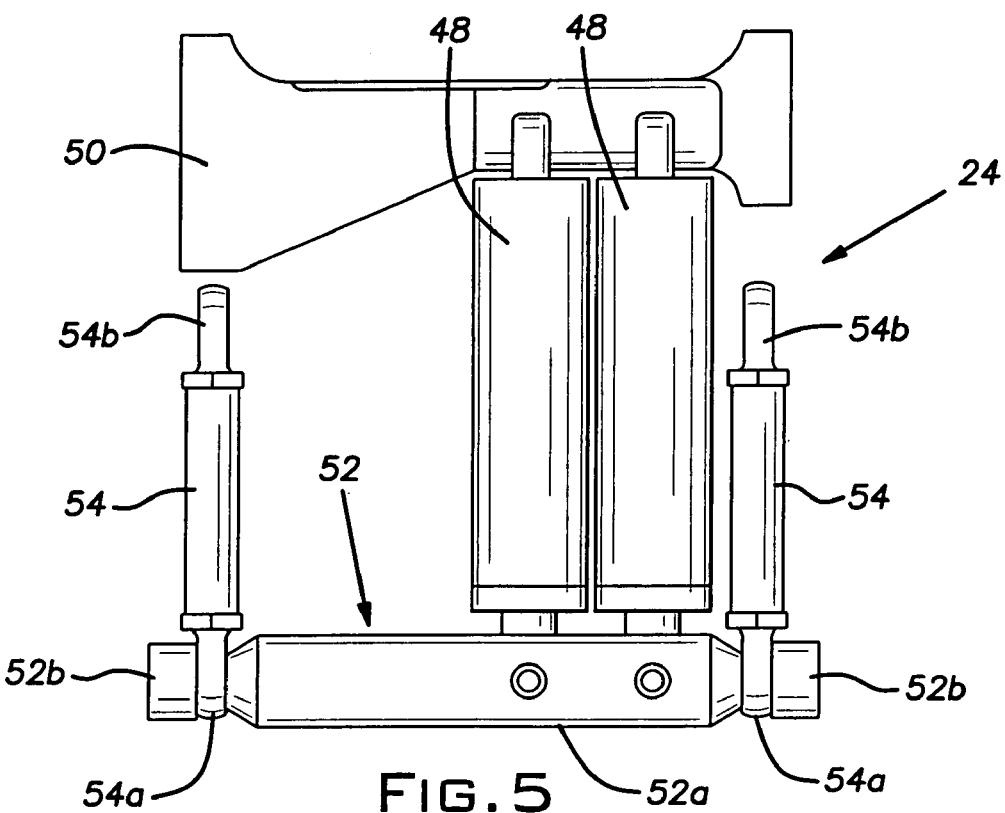

With reference to FIG. 1, a motorcycle 10 incorporating the improved rear suspension assembly 12 according to the present invention is illustrated in a somewhat schematic or simplified manner. The motorcycle 10 includes a front wheel 14, a rear wheel 16, an engine 18, a front or main frame 20, and a rear swing frame 22. The rear suspension assembly 12 includes the swing frame 22 and a pull shock assembly 24 (FIG. 5), described hereinafter.

The front wheel 14 is mounted to the lower end of the front forks 26 that are pivotally secured to the steering head, which is affixed to the main frame 20. The engine 18 is relatively forwardly disposed, and is mounted between upper and lower rails 28, 30 of the main frame 20. The rear wheel 16 is rotatably affixed to the rear end of the rear swing frame 22, and rotatably driven by the engine 18 via a transmission and drive means, such as a drive belt, drive chain, or drive shaft, as is conventional.

Figure 2A:
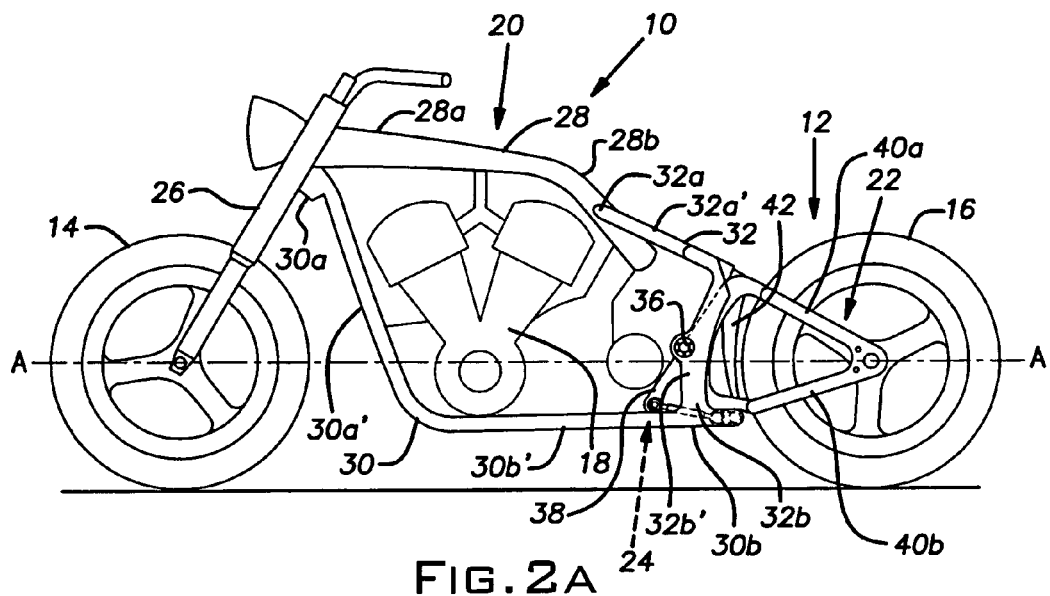
FIG. 2A is a schematic side elevational view of a motorcycle incorporating the rear suspension of the present invention, and illustrating the suspension in a passive condition.
Figure 2B:
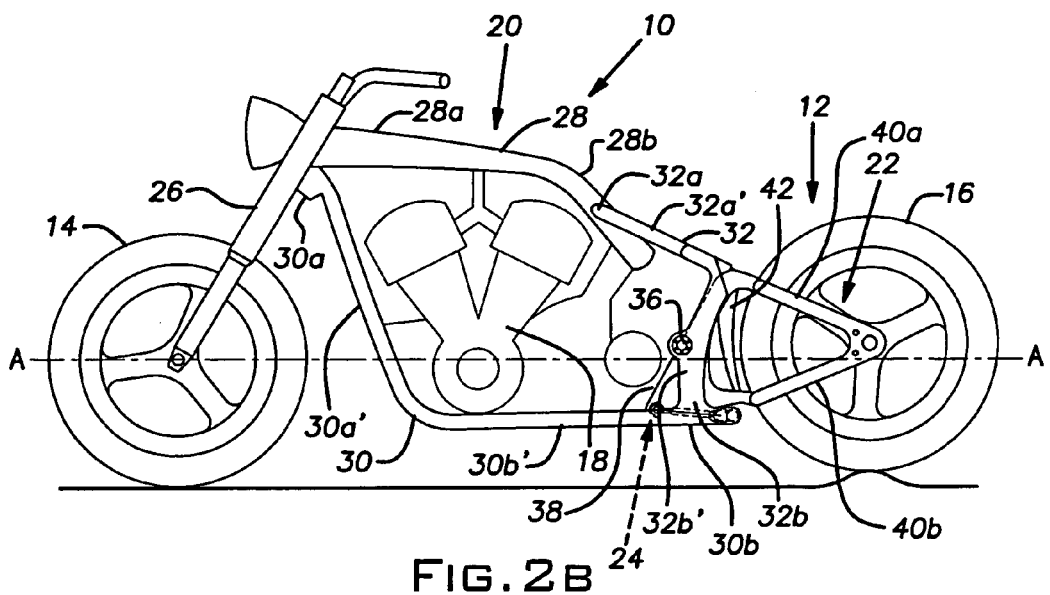
FIG. 2B is a schematic side elevational view of the motorcycle of FIG. 2A, illustrating the suspension in an active condition.
Figure 3:
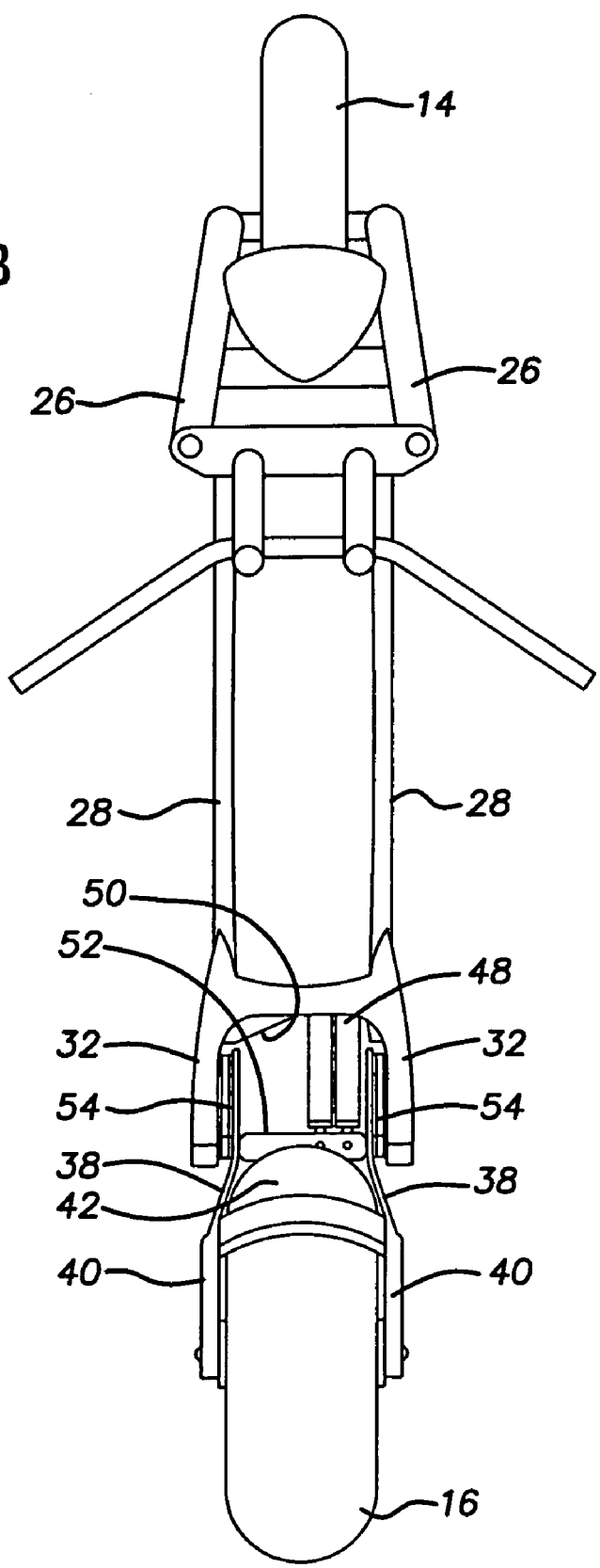
FIG. 3 is a top perspective view of the motorcycle shown in FIG. 2A.

With reference to FIGS. 2A, 2B, and 3, the front or main frame 20 includes a pair of upper rails 28, a pair of lower rails 30, and a pair of rear rails 32. Each of the upper rails 28 have a forward portion 28a and a rearward portion 28b.

Each of the lower rails 30 have an upper, forward end 30a and a lower, rearward end 30b. Each of the rear rails 32 have an upper end 32a and a lower end 32b.

Figure 4:
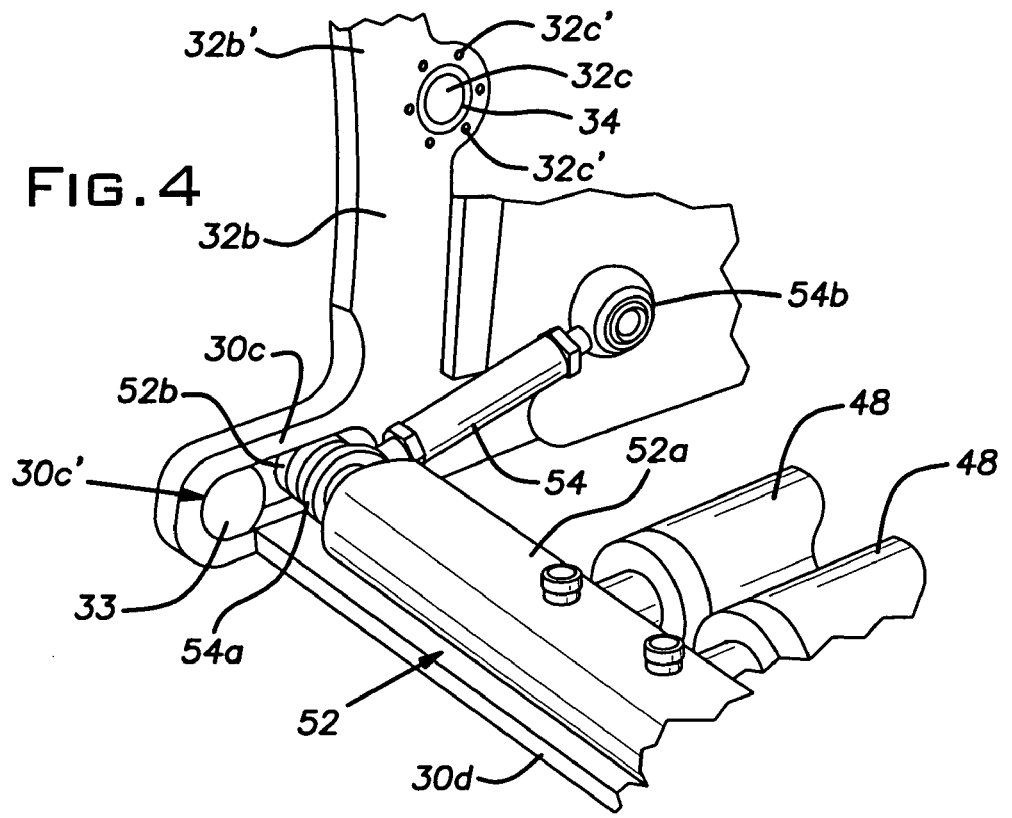
FIG. 4 is a perspective view illustrating the rear portion of the main frame and a portion of the rear suspension assembly secured thereto; and, FIG. 5 is a top perspective view of the rear suspension assembly.

More specifically, the lower rails 30 are somewhat L-shaped when viewed from the side, so as to define a first portion 30a' that extends downwardly from the lower rails' upper forward end 30a, at which point the lower rails 30 are affixed to the upper rails 28, and a second portion 30b' that integrally extends rearwardly from a lower end of the first portion 30a' and terminates in the pair of slide tracks 30c at the lower rearward end 30b, which will be discussed further hereinafter with regard to FIGS. 2C, 2D, and 4. Preferably, each of the slide tracks 30c receives an elastomeric stop member 33. The lower rails 30 preferably include at least one cross member 30d that extends between and interconnects the slide tracks 30c.

The cross member 30d has a low profile so as to be positioned vertically below, and thereby not interfere with, the channels 30c' defined by slide tracks 30c, as will be apparent from the following description.

The lower end 32b of the rear rails 32 are joined to the lower rails 30 at a location that is just forward or ahead of the rearward end 30b of the lower rails 30 such that the slide tracks 30c extend rearwardly of the union of the rear rails 32 and the lower rails 30. The lower rails 30 may include further cross members (not shown) that extend between and interconnect other portions of the lower rails 30, such as the first portion 30a' of the lower rails 30, so as to stiffen and unify the main frame.

The upper rails' forward portions 28a are secured to the upper, forward ends 30a of the lower rails 30, as noted hereinbefore. The upper rails' rearward portions 28b are secured to the upper end 32a of the rear rails 32. The upper rails' forward portions 28a are generally parallel to the lower rails' second portions 30b', while the upper rails' rearward portion 28b curves downwardly from the upper rails' forward portion 28a. Naturally, the forward and rearward portions 28a, 28b are affixed to one another, such as by welding.

The rear rails 32 are shaped somewhat like an inverted L when viewed from the side, and each include a forward arm 32a' that terminates in the upper end 32a, which is connected to the rearward portion 28b of the associated upper rail 28, and a downward leg 32b' that includes the lower end 32b, which is connected to the rearward end second portion 30b' of the corresponding lower rail 30.

Each of the downward legs 32b' defines an opening 32c that receives a bearing or bushing 34 (e.g. a sleeve bearing) to which and through which a stub axle 36 extends, as described more fully hereinafter. A series of threaded bores 32c' surround the opening 32c to permit the bearing/bushing 34 and/or the stub axle 36 to be affixed to the downward leg 32b'.

The rear rails 32 also include forward and rearward cross members 32d, 32e to interconnect and unify the rear rails 32. The forward cross member 32d extends between the forward ends of the rear rails' forward arms 32a', whereas the rearward cross member 32e extends between the rearward ends of the rear rails' forward arms 32a'.

The rear swing frame 22 includes a pair of generally triangular plate-like forward portions 38, a pair of rearward portions 40, and an inner half fender 42.

The forward portion 38 includes an upper end 38a, a lower end 38b, and defines an opening 38c that receives a bearing 44. The bearing opening 38c is surrounded by threaded openings 38c' that align with the threaded bores 32c' surrounding the opening 32c in the downward leg 32b' of the rear rails 32. Accordingly, threaded fasteners affix bearings/bushings 34, 44 and/or the stub axles 36, which extend through the aligned bushing/bearings 34, 44, while permitting the rear swing frame 22 to pivot about the stub axles 36, as will be apparent from the following discussion.

In this regard it is noted that the pivotal connection is relatively forwardly disposed and, as such, the forward portions 38 of the swing frame 22 are disposed between the rear rails 32 of the main frame 20. Accordingly, the pivotal connection defined by the stub axle 36 is forward of the slide tracks 30c, as will be described more fully hereinafter. Naturally, the stub axle 36 may be in the form of a bolt and, as such, may have a nut threaded onto its inner or distal end. It is further noted that the pivotal connection between the main frame 20 and the swing frame 22 may be replaced by other known or hereafter developed structures without departing from the scope and spirit of the present invention. For example, the pivotal swing frame mounting structure taught in U.S. Pat. No. 4,556,119, the disclosure of which is expressly incorporated herein in its entirety, may be used herein.

Each of the rearward portions 40 each include an upper arm 40a and a lower arm 40b. A forward or proximal end 40a' of the upper arm 40a is affixed to the upper end 38a of the forward portion 38 while a forward or proximal end 40b' of the lower arm 40b is affixed to the lower end 38b of the swing frame forward portion 38. The distal or rearward ends 40a", 40b" of the upper and lower arms 40a, 40b are integrally affixed to one another and cooperate to define a mount to which the rear wheel 16 is rotatably secured.

The inner half fender 42 extends between and unifies the interconnection of the upper arm 40a with the forward portion 38 and the interconnection of the lower arm 40b and the forward portion 38, as illustrated.

The pull shock assembly 24 is affixed to the main frame 20 and includes at least one and, preferably, a pair of shock absorbers or dampers 48, a forward mounting bar 50, a slide member 52, and a pair of link arms 54. The forward mounting bar 50 is affixed, preferably by welding, between the second portions 30b' of the lower rails 30b of the main frame 20, relatively ahead of the slide tracks 30c. In this regard it is noted that the mounting bar 50 serves as a cross member linking the opposite sides of the main frame 20.

The dampers 48 extend between and interconnect the stationary mounting bar 50 and the slidably movable slide member 52. The dampers 48 are of a conventional construction, such as a cylindrical housing that receives a fluid and/or spring damped piston, and accordingly will not be discussed further hereinafter.

The slide member 52 has a body portion 52a having slides or rollers 52b extending from each end. Each of the slides or rollers 52b is slidably received within an associated one of the channels 30c' of the slide tracks 30c.

As illustrated, an annular narrowing is formed between the body portion 52a and the rollers 52b in which a rearward end 54a of the link arms 54 is received. A forward end 54b of the link arms 54 is pivotally received over the mounts 38b" provided at the forward lower end 38b' of the swing frame forward portion 38, as will be described hereinafter. As will be appreciated, the link arms 54 have a solid body portion to which the forward and rearward ends 54b, 54a are secured, with the ends 54a, 54b including bearings so as to permit pivotal connection of the link arms 54 to both the slide member 52 and the swing frame 22. As will be appreciated, the link arms 54 may have a static or non-adjustable length or, preferably, the length of the link arms 54 may be adjusted by threading the forward and rearward ends 54a, 54b of the link arms 54 into the solid body portion. It is further noted that, so long as the function is maintained, various link arms and link arm mounting schemes may be used in conjunction with the present invention without departing from the scope and spirit of the present invention.

When the main frame 20, swing frame 22, and pull shock assembly 24 are assembled, the swing frame 22 is pivotally secured to the main frame 20 via the stub axle 36 and cooperation of the bearings/bushings 34, 44. The forward portion 38 of the swing frame 22 fits between the downward legs of the 32b' of the rear rails 32, and the mounts 38b" provided by the swing frame forward portion 38 are disposed forwardly or ahead of the slide tracks 30c of the main frame lower rails 30. The link arms 54 extend between and interconnect the pull shock assembly 24 to the swing frame 22 and are at a slight angle relative to horizontal, and are generally concealed from view by the lower rails 30 of the main frame 20. More specifically, the link arms 54 connect the swing frame 22 to the slide member 52, the rollers of which are is slidably received and movable within the slide tracks 30c. Thus, the swing frame 22, upon which the rear wheel 16 is rotatably mounted, is able to pivot relative to the main frame 20 in a controlled or damped fashion.

With reference to FIG. 2A, the motorcycle 10 incorporating the suspension of the present invention is schematically illustrated, with portion removed therefrom for clarity, and showing the suspension in an at rest or passive condition. As is shown, reference plane A—A extending along the length of the motorcycle 10 passes through the rotational axis of the front wheel and the rotational axis of the rear wheel 16, when the suspension is in a passive or at-rest condition. As used in the description that follows, the reference plane A—A is stationary and substantially parallel to the ground and to the lower rails second end 30b', and will be used hereinafter to help define and describe motion of the rear swing frame 22 relative to the main frame 20 and related motion of the pull-shock assembly 24.

It is further noted that the pivot axis of the swing frame 22, which is defined by the stub axle 36, is disposed relatively above the axis A—A when the suspension is passive (FIG. 2A) and also when the suspension is active (FIG. 2B). It is further noted that the swing frame pivot axis is disposed relatively forward and above the slide tracks 30c, and that the link arms 54 are generally concealed by the second end 30b' of the lower rails 30.

As the rear swing frame is pivoted upwardly from the passive condition (FIG. 2A) into an active condition, such as when the rear wheel goes over a bump (FIG. 2B), the rear wheel 16 moves upwardly (above the reference plane A—A) causing the rearward ends 40a", 40b" of the upper and lower arms 40a, 40b to move upwardly and thereby cause the rear swing frame 22 to pivot about the stub axle 36. The lower forward end 38b' of the swing frame forward portion 38 moves downwardly and rearwardly, which drives the slide member 52 rearwardly in the slide tracks 30c toward the elastomeric stop member 33 due to the rigid connection between the forward portion 38 and the slide member 52. The stop member 33 prevents the slides or rollers 52b from engaging the end of the associated slide tracks 30c.

Sliding movement of the slide member 52 causes the dampers 48 to extend, and thereby urge the slide member 52 and, thus, the rear swing frame 22, back toward the at-rest position. As will be apparent to those skilled in the art, assuming that the passive condition for the slide member 52 is relatively mid-way along the length of the slide tracks 30c (i.e., between about one-quarter and three-quarters of the available slide member travel), a substantially identical, albeit opposite in direction, sequence of motions will occur should the rear wheel 16 go into a hole.

The construction of the rear suspension assembly 12 and positioning of the pull shock assembly 24 of the present invention in the manner described and illustrated hereinbefore provide several advantages. For example, the rear suspension assembly 12 of the present invention does not occupy much space within the motorcycle, and frees a substantial amount of space between the upper and lower rails of the main frame 20 that can now be used for essential motorcycle components, such as the engine and radiator, which can now be positioned more freely than would be otherwise possible. The pull shock assembly 24 has, a low profile vertically and occupies little space, especially fore and aft space between the engine 18 and the rear tire 16. Moreover, the pull shock assembly is substantially hidden from view, and affords a remarkably clean and appearance to the motorcycle.

Although the currently preferred embodiment of the present invention has been described herein with specificity, it is submitted that the present invention is not limited thereto, but rather is capable of numerous modifications, rearrangements and substitutions of parts without departing from the scope and spirit of the present invention, as embodied in the claims appended hereto. For example, it is considered clear that the front or main frame could be formed in numerous different ways without departing from the scope and spirit of the present invention. Moreover, the particular construction and arrangement of the pull shock assembly may be considered to exemplary in many ways. For example, while a pair of dampers is currently preferred, it is considered apparent that a single damper could be used in place of the pair of dampers that were described and illustrated herein. Further, the specific structure of the swing frame described herein is not to be interpreted in a limiting fashion. Rather, it is apparent that the swing frame can take on numerous appearances so long as the function of the swing frame described herein be retained. Finally, the particular manner of pivotally securing or mounting the swing frame to the main frame is not restrictive. Rather, those skilled in the art may devise any number of functionally equivalent methods to pivotally secure the swing frame to the main frame.

What is claimed is:

1. A motorcycle subassembly, comprising:
   a main frame, said main frame having a forward end and a rearward end; and,
   a rear suspension assembly, comprising:
      a rear swing frame, said swing frame being pivotally secured to said main frame and defining a pivoting axis; and,
      a pull shock assembly, said pull shock assembly including a slide member and a damper, said slide member being slidably secured to said main frame at a location that is rearward of the pivoting axis, while said damper is affixed to said slide member and to said main frame, said slide member being operatively associated with said rear swing frame;
   wherein, pivotal movement of said rear swing frame relative to said main frame causes said slide member to slidably move relative to said main frame against a biasing force of said damper.

2. The motorcycle subassembly according to claim 1, wherein said main frame includes a slide track that receives said slide member.

3. The motorcycle subassembly according to claim 2, wherein said pull shock assembly further comprises a link that extends between said rear swing frame and said slide member, said link forcing said slide member to slidably move relative to said main frame upon pivotal movement of said rear swing frame relative to said main frame.

4. The motorcycle subassembly according to claim 3, wherein said link includes a forward end that is pivotally secured to said rear swing frame and a rearward end that is pivotally secured to said slide member.

5. The motorcycle subassembly according to claim 4, wherein said link forward end is disposed relatively forward of the pivoting axis while said link rearward end is disposed relatively rearward of the pivoting axis.

6. A motorcycle subassembly, comprising:
a main frame, said main frame having a forward end and a rearward end; and,
a rear suspension assembly, comprising:
a rear swing frame, said swing frame being pivotally secured to said main frame; and,
a pull shock assembly, said pull shock assembly including a slide member and a damper, said slide member being slidably secured to said main frame while said damper is affixed to said slide member and to said main frame, said slide member being operatively associated with said rear swing frame;
wherein, pivotal movement of said rear swing frame relative to said main frame causes said slide member to slidably move relative to said main frame against a biasing force of said damper and
wherein said pull shock assembly further comprises a link that extends between said rear swing frame and said slide member, said link forcing said slide member to slidably move relative to said main frame upon pivotal movement of said rear swing frame relative to said main frame.

7. The motorcycle subassembly according to claim 6, wherein said main frame includes a slide track that receives said slide member.

8. The motorcycle subassembly according to claim 6, wherein said link includes a forward end secured to said rear swing frame and a rearward end that is secured to said slide member.

9. The motorcycle subassembly according to claim 8, wherein said link forward end is pivotally secured to said rear swing frame and said link rearward end is pivotally secured to said slide member.

10. The motorcycle subassembly according to claim 9, wherein said main frame includes a slide track that receives said slide member.

11. The motorcycle subassembly according to claim 8, wherein said link forward end is disposed relatively forward of the pivotal connection between said rear swing frame and said main frame.

12. The motorcycle subassembly according to claim 11, wherein said link forward end is pivotally secured to said rear swing frame and said link rearward end is pivotally secured to said slide member.

13. The motorcycle subassembly according to claim 12, wherein said main frame includes a slide track that receives said slide member.

14. A motorcycle assembly, comprising:
a main frame, said main frame having a forward end and a rearward end, said rearward end of said main frame including a slide track;
a front wheel operatively secured to said main frame and defining a first rotational axis;
a rear suspension assembly, comprising:
a rear swing frame, said swing frame being pivotally secured about a pivoting axis to said main frame rearward end at a location relatively forward of said slide track; and,
a shock assembly that includes a slide member and a damper, said slide member being slidably received within said slide track provided by said main frame rearward end while said damper is affixed to said slide member and to said main frame, said slide member being operatively associated with said rear swing frame so as to translate pivotal movement of said rear swing frame into longitudinal movement of said slide member and said shock assembly being operable to dampen pivotal movement of said rear swing frame relative to said main frame;
a rear wheel operatively secured to said rear swing frame and being vertically movable therewith, said rear wheel defining a second rotational axis;
wherein said rear swing frame is secured to said main frame for pivotal motion about said pivoting axis at a location that is vertically above a line extending between said first and second rotational axes.

15. The motorcycle assembly according to claim 14, wherein pivotal movement of said rear swing frame relative to said main frame causes said slide member to slidably move relative to said main frame against a biasing force of said damper.

16. The motorcycle assembly according to claim 15, wherein said shock assembly further comprises a link that extends between said rear swing frame and said slide member, said link forcing said slide member to slidably move relative to said main frame upon pivotal movement of said rear swing frame relative to said main frame.

17. The motorcycle assembly according to claim 16, wherein said link includes a forward end secured to said rear swing frame and a rearward end that is secured to said slide member.

18. The motorcycle assembly according to claim 17, wherein said link forward end is pivotally secured to said rear swing frame and said link rearward end is pivotally secured to said slide member.

19. The motorcycle assembly according to claim 17, wherein said link forward end is disposed relatively forward of the pivotal connection between said rear swing frame and said main frame.

20. The motorcycle assembly according to claim 19, wherein said link forward end is pivotally secured to said rear swing frame and said link rearward end is pivotally secured to said slide member.

* * * * *